United States Patent
Sugaya

(10) Patent No.: US 9,686,659 B2
(45) Date of Patent: Jun. 20, 2017

(54) USER TERMINAL, METHOD OF TRANSMITTING MESSAGE, AND PROGRAM FOR USER TERMINAL

(71) Applicant: OPTiM Corporation, Saga (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 0 days.

(21) Appl. No.: 14/982,289

(22) Filed: Dec. 29, 2015

(65) Prior Publication Data
US 2017/0094483 A1    Mar. 30, 2017

(30) Foreign Application Priority Data
Sep. 28, 2015  (JP) ................................. 2015-189436

(51) Int. Cl.
*H04W 4/12* (2009.01)
*H04M 3/53* (2006.01)
*H04M 3/533* (2006.01)
*G10L 15/26* (2006.01)

(52) U.S. Cl.
CPC ............. *H04W 4/12* (2013.01); *G10L 15/265* (2013.01); *H04M 3/533* (2013.01); *H04M 3/5322* (2013.01)

(58) Field of Classification Search
CPC .............. H04W 76/025; H04M 15/72; H04M 3/42161; H04M 3/523; H04M 3/20; H04M 1/56; H04M 1/57; H04M 2207/18; H04M 3/51; H04M 3/42059; H04M 1/723; H04M 1/72552; H04M 2203/2005; H04M 2203/551; H04M 3/42102; H04M 3/5322; H04M 7/003
See application file for complete search history.

(56) References Cited

U.S. PATENT DOCUMENTS

| | | | |
|---|---|---|---|
| 2005/0266829 A1* | 12/2005 | Tran | H04M 3/537 455/412.1 |
| 2014/0119527 A1* | 5/2014 | Cohen | H04M 3/4365 379/207.13 |

FOREIGN PATENT DOCUMENTS

JP   2010-141754   6/2010

* cited by examiner

*Primary Examiner* — Nizar Sivji
(74) *Attorney, Agent, or Firm* — Lex IP Meister, PLLC

(57) ABSTRACT

The user terminal capable of transmitting a phone call and a message between terminals transmits a phone call to a phone number of an other party to connect to the phone number of the other party; detects no connection to a terminal of the other party by the transmitted phone call; disconnects a line before the user terminal is connected with a voice mail system for the other party 200 if detecting no connection to a terminal of the other party; receives an input of a voice message from a caller; converts the received input of a voice message into a text message; extracts a message address of the other party corresponding to the phone number of the other party; and transmits the converted text message to the extracted message address.

5 Claims, 6 Drawing Sheets

USER TERMINAL, METHOD OF TRANSMITTING MESSAGE, AND PROGRAM FOR USER TERMINAL

CROSS REFERENCE TO RELATED APPLICATIONS

This application claims priority to Japanese Patent Application No. 2015-189436 filed on Sep. 28, 2015, the entire contents of which are incorporated by reference herein.

TECHNICAL FIELD

The present invention relates a user terminal, a method of transmitting a message, and a program for a user terminal that are capable of transmitting a phone call and a message between terminals.

BACKGROUND ART

In the past in mobile phones, etc., if a destination user terminal does not respond to a phone call transmitted from a source user terminal, the source user terminal is connected with the voice mail system to store a voice message in the voice mail system.

Such a voice mail system is known to transmit a notification that a voice message is stored in a voice mail system when a voice message is stored.

For example, Patent Document 1 discloses the constitution in which the text message saying that a voice message is stored in a voice mail system 1 is transmitted to a user terminal so that the user can listen to the voice message by connecting to the voice mail system 1.

CITATION LIST

Patent Literature

Patent Document 1: JP 2010-141754 A

SUMMARY OF INVENTION

However, in the constitution of Patent Document 1, a user who reads the notification from the voice mail system can know the content of the voice message stored in the voice mail system by connecting to the voice mail system. Since a user needs to connect to the voice mail system in order to know the content of a voice message, the constitution of Patent Document 1 is less convenient.

Therefore, the present invention pays attention to the convenience without the connection of a user with a voice mail system when a destination user terminal does not respond to a call.

The objective of the present invention is to provide a user terminal, a method of transmitting a message, and a program for a user terminal that improve the convenience.

According to the first aspect of the present invention, a user terminal capable of transmitting a phone call and a message between terminals includes:

a voice transmitting unit that transmits a phone call to a phone number of an other party to connect to the phone number of the other party;

a detection unit that detects no connection to a terminal of the other party by the transmitted phone call;

a disconnection unit that disconnects a line before the user terminal is connected with a voice mail system for the other party if the detection unit detects no connection to a terminal of the other party;

a voice message input receiving unit that receives an input of a voice message from a caller;

a text conversion unit that converts the received input of a voice message into a text message;

a message address extraction unit that extracts a message address of the other party corresponding to the phone number of the other party; and a message transmitting unit that transmits the converted text message to the extracted message address.

According to the first aspect of the present invention, a user terminal capable of transmitting a phone call and a message between terminals transmits a phone call to a phone number of an other party to connect to the phone number of the other party; detects no connection to a terminal of the other party by the transmitted phone call; disconnects a line before the user terminal is connected with a voice mail system for the other party if detecting no connection to a terminal of the other party; receives an input of a voice message from a caller; converts the received input of a voice message into a text message; extracts a message address of the other party corresponding to the phone number of the other party; and transmits the converted text message to the extracted message address.

The first aspect of the invention belongs to the category of a user terminal but has the same working effects under different categories such as a method of transmitting a message and a program for a user terminal.

According to the second aspect of the present invention, in the user terminal according to the first aspect of the present invention, the detection unit detects no connection to a terminal of the other party by a connection with the voice mail system.

According to the second aspect of the present invention, the user terminal according to the first aspect of the present invention detects no connection to a terminal of the other party by a connection with the voice mail system.

According to the third aspect of the present invention, in the user terminal according to the first or the second aspect of the present invention, the detection unit detects no connection to a terminal of the other party by recognizing voice from the voice mail system.

According to the third aspect of the present invention, the user terminal according to the first or the second aspect of the present invention detects no connection to a terminal of the other party by recognizing voice from the voice mail system.

According to the fourth aspect of the present invention, a method of transmitting a message, the method being capable of transmitting a phone call and a message between terminals, includes the steps of:

transmitting a phone call to a phone number of an other party to connect to the phone number of the other party;

detecting no connection to a terminal of the other party by the transmitted phone call;

disconnecting a line before the user terminal is connected with a voice mail system for the other party if detecting no connection to a terminal of the other party;

receiving an input of a voice message from a caller;

converting the received input of a voice message into a text message;

extracting a message address of the other party corresponding to the phone number of the other party; and transmitting the converted text message to the extracted message address.

According to the fifth aspect of the present invention, a computer program product for use in a user terminal capable of transmitting a phone call and a message between terminals includes a non-transitory computer usable medium having a set of instructions physically embodied therein, the set of instructions including computer readable program code, which when executed by the user terminal causes the information processing unit to:

transmit a phone call to a phone number of an other party to connect to the phone number of the other party;

detect no connection to a terminal of the other party by the transmitted phone call;

disconnect a line before the user terminal is connected with a voice mail system for the other party if detecting no connection to a terminal of the other party;

receive an input of a voice message from a caller;

convert the received input of a voice message into a text message;

extract a message address of the other party corresponding to the phone number of the other party; and transmit the converted text message to the extracted message address.

The present invention can provide a user terminal, a method of transmitting a message, and a program for a user terminal that improve the convenience.

BRIEF DESCRIPTION OF DRAWINGS

FIG. 4 is a flow chart of the message transmitting process executed by the source user terminal 100a.

FIG. 5 shows a voice recognition screen displayed on the source user terminal 100a.

DESCRIPTION OF EMBODIMENTS

Embodiments of the present invention will be described below with reference to the attached drawings. However, this is illustrative only, and the technological scope of the present invention is not limited thereto.

Overview of Message Transmitting System 1

Figure 1:
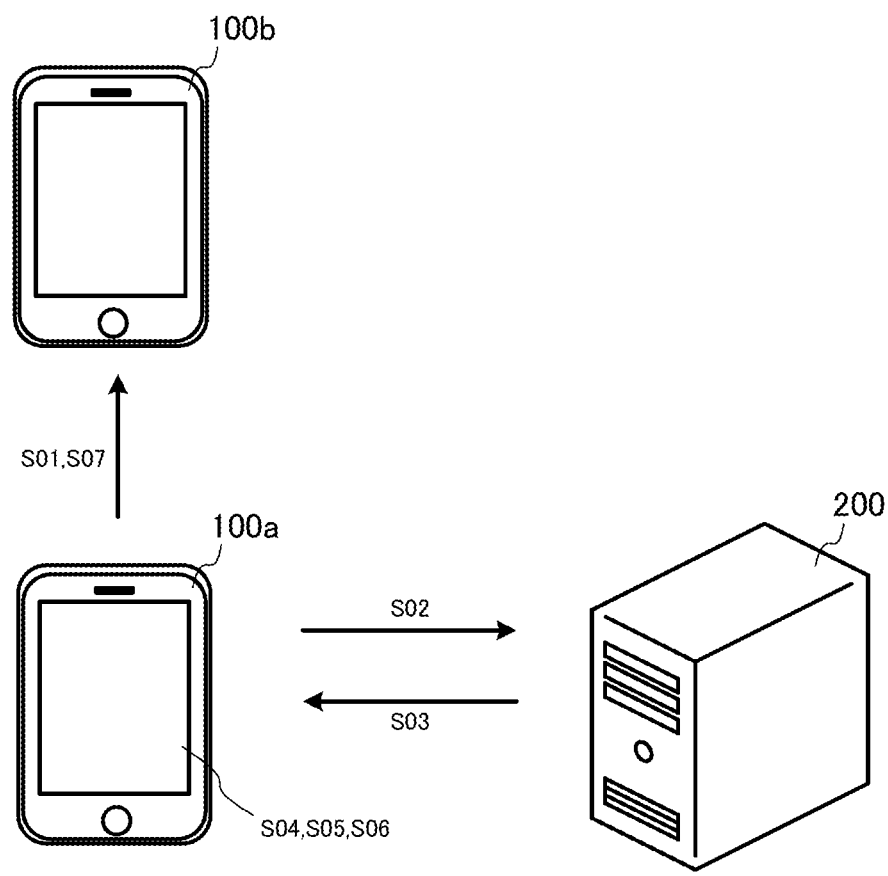
FIG. 1 conceptually shows the message transmitting system 1.

The overview of the present invention will be described below with reference to FIG. 1. The message transmitting system 1 includes a source user terminal 100a, a destination user terminal 100b, and a voice mail system 200 for a destination user terminal 100b. In this embodiment, the source user terminal 100a transmits a phone call to the destination user terminal 100b.

The source user terminal 100a, the destination user terminal 100b, and the voice mail system 200 are communicatively connected among themselves through a public line network (e.g. a third or a fourth generation communication network), a phone network, etc. Moreover, the voice mail system 200 is a general voice mail system, which stores voice messages in a server, etc., and outputs voice messages to a terminal on request from a user.

First, the source user terminal 100a transmits a phone call to the destination user terminal 100b (step S01). In the step S01, the source user terminal 100a transmits a phone call to the phone number of the destination user terminal 100b that is directly input or retrieved from the address book, etc., stored in the source user terminal 100a itself to connect to the phone number of the destination user terminal 100b.

The source user terminal 100a is connected with the voice mail system 200 if the destination user terminal 100b does not respond to the phone call transmitted from the source user terminal 100a within a predetermined time (step S02).

The voice mail system 200 outputs a predetermined voice message to the source user terminal 100a being connected with the voice mail system 200 (step S03). In the step S03, an example of the predetermined voice message output from the voice mail system 200 includes "This is the voice mail system service."

The source user terminal 100a detects no connection to the destination user terminal 100b by the transmitted phone call. The source user terminal 100a may detect no connection to the destination user terminal 100b by detecting a connection with the voice mail system 200. Furthermore, the source user terminal 100a may detect no connection to the destination user terminal 100b by receiving and recognizing a voice message output from the voice mail system 200.

If detecting no connection to the destination user terminal 100b, the source user terminal 100a stops transmitting the phone call and disconnecting a communication line before connected with the voice mail system 200 (step S04). In the step S04, "before the source user terminal 100a is connected with the voice mail system 200" means "before the user of the source user terminal 100a stores a voice message in the voice mail system 200."

The source user terminal 100a starts a voice recognition application to receive an input of a voice message. The source user terminal 100a recognizes the received voice message to convert the voice message into a text message (step S05). In the step S05, the source user terminal 100a may always run a voice recognition application and receive an input of a voice message after the step S04.

The source user terminal 100a starts an address book application and extracts a message address corresponding to the phone number of the destination user terminal 100b to which the source user terminal 100a transmits a phone call in the step S01 (step S06).

The source user terminal 100a transmits the text message generated in the step S05 to the extracted message address corresponding to the destination user terminal 100b (step S07).

The destination user terminal 100b receives and displays the message transmitted from the source user terminal 100a.

System Configuration of Message Transmitting System 1

Figure 2:
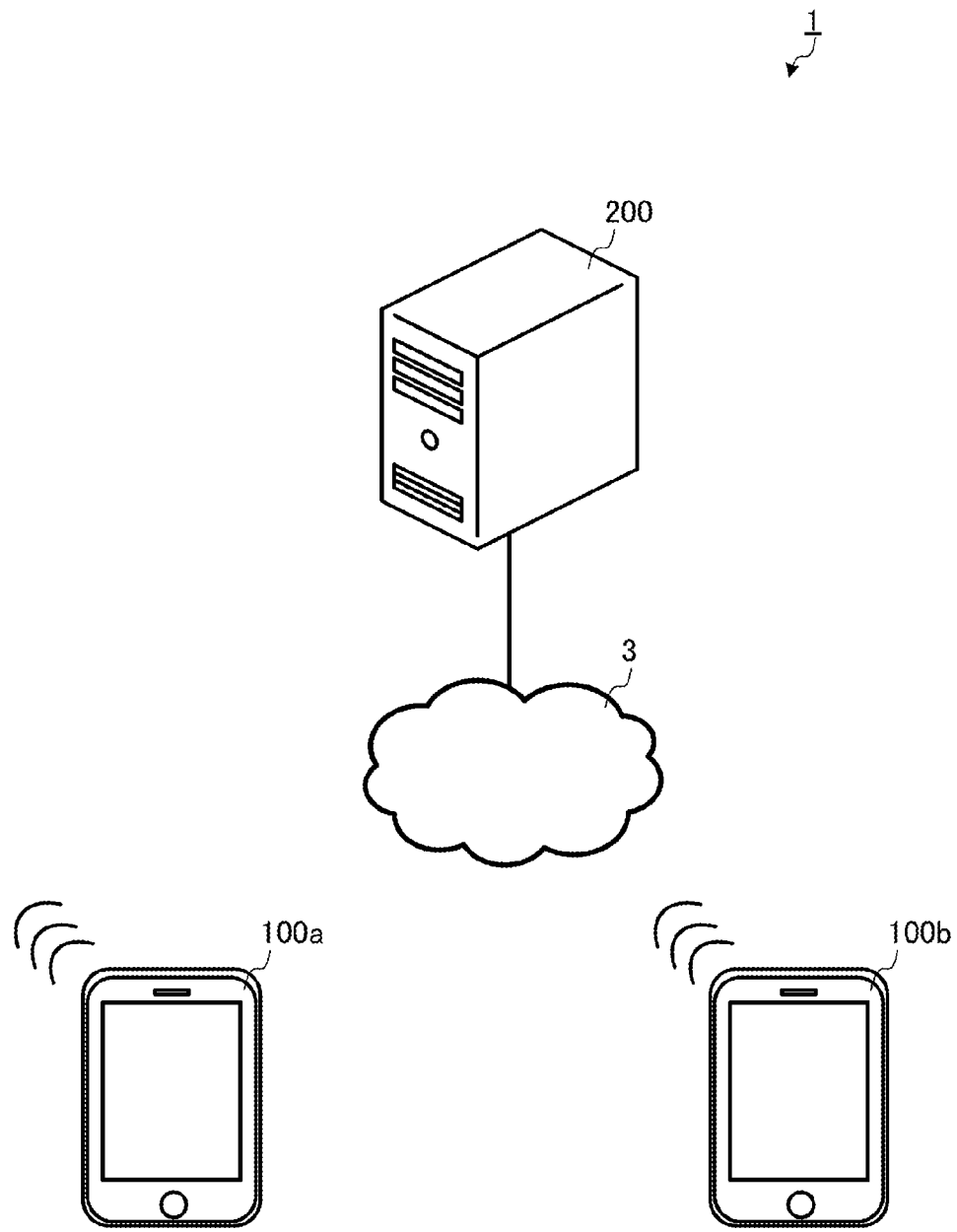
FIG. 2 is an overall schematic diagram of the message transmitting system 1.

FIG. 2 shows a system configuration diagram of the message transmission system 1 according to a preferred embodiment of the present invention. The message transmitting system 1 includes a source user terminal 100a and a destination user terminal 100b (hereinafter referred to as "user terminals 100" unless otherwise stated), a voice mail system 200, and a public line network 3 (e.g. a third or a fourth generation communication network).

The user terminal 100 has functions to be described later, which capable of data communication and voice call. The user terminal 100 is a home or an office appliance. Examples of the source user terminal 100 include information appliances such as a mobile phone, a portable terminal, a net book terminal, a slate terminal, an electronic book terminal, and a portable music player.

The voice mail system 200 is a general voice mail system, which stores voice messages from a terminal in a server, etc., and outputs voice messages to a terminal on request from a user.

Functions

Figure 3:
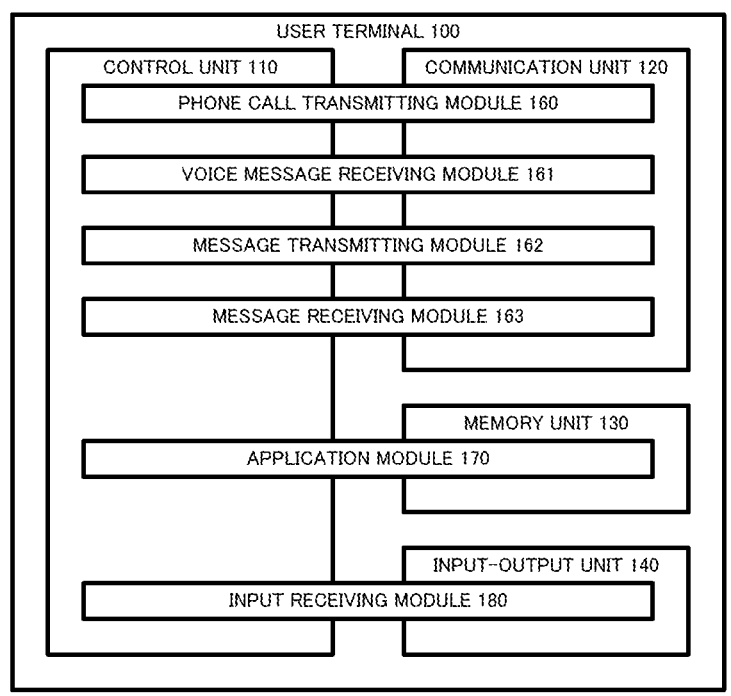
FIG. 3 is a functional block diagram of the user terminal 100.

The structure of each device will be described below with reference to FIG. 3.

The user terminal 100 includes a control unit 110 such as a central processing unit (hereinafter referred to as "CPU"), a random access memory (hereinafter referred to as "RAM"), and a read only memory (hereinafter referred to as "ROM") and a communication unit 120 such as a device capable of communicating with other devices, for example, a Wireless Fidelity or Wi-Fi® enabled device complying with IEEE 802.11, or a device capable of transmitting a voice call.

The user terminal 100 also includes a memory unit 130 such as a hard disk, a semiconductor memory, a recording medium, or a memory card to store data. The memory unit 130 stores an address book associating a phone number to be described later with a mail address, etc.

The user terminal 100 also includes an input-output unit 140 including a display unit outputting and displaying data and images that have been processed by the control unit1 110; and an input unit receiving an input from a user, such as a touch panel, a keyboard, and a mouse; and an output unit such as a speaker outputting voice and a microphone collecting voice.

In the user terminal 100, the control unit 110 reads a predetermined program to run a phone call transmitting module 160, a voice message receiving module 161, a message transmitting module 162, and a message receiving module 163 in cooperation with the communication unit 120. Furthermore, in the user terminal 100, the control unit 110 reads a predetermined program to run an application module 170 in cooperation with the memory unit 130. Still furthermore, in the user terminal 100, the control unit 110 reads a predetermined program to run an input receiving module 180 in cooperation with the input-output unit 140.

Message Transmitting Process

Figure 4:
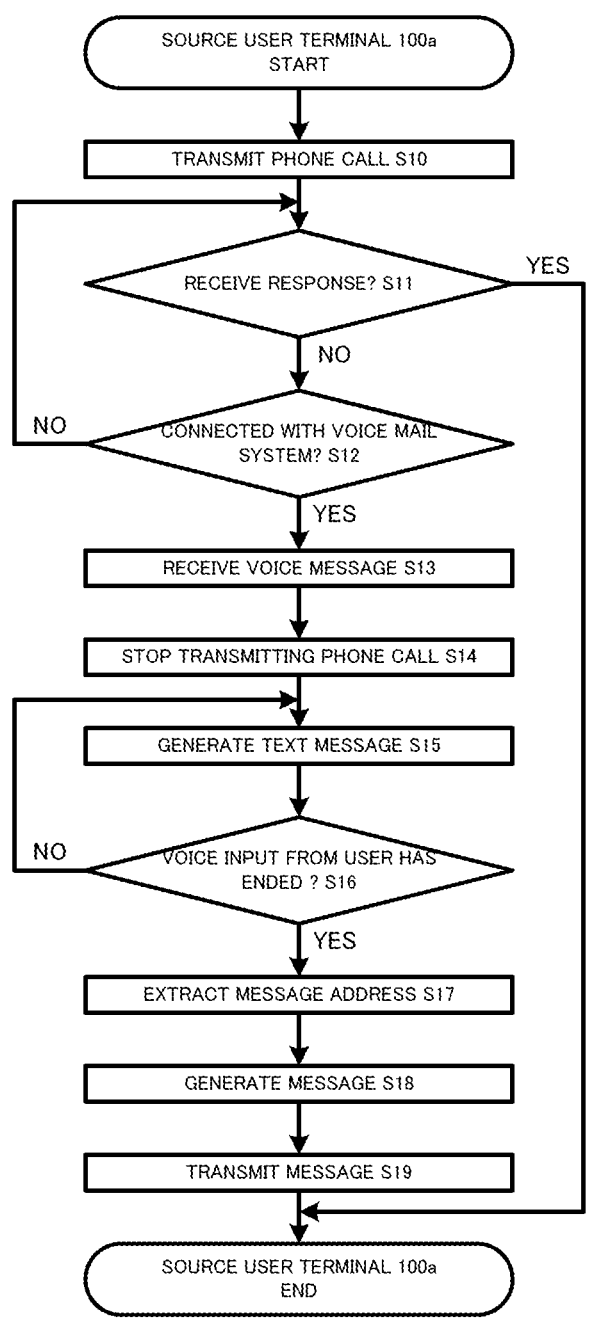

FIG. 4 is a flow chart of the message transmitting process executed by the source user terminal 100a and the destination user terminal 100b. The tasks executed by the modules of the above-mentioned devices are described below together with this process.

First, the phone call transmitting module 160 of the source user terminal 100a transmits a phone call to the destination user terminal 100b (step S10). In the step S10, the phone call transmitting module 160 transmits a phone call to the destination user terminal 100b whose phone number is directly received by the input receiving module 180 of the source user terminal 100a or searched by an input phone number received by the input receiving module 180 and retrieved from an address book, etc., stored in the source user terminal 100a itself.

The phone call transmitting module 160 of the source user terminal 100a judges whether or not the destination user terminal 100b responds to the transmitted phone call (step S11). In the step S11, the phone call transmitting module 160 detects a connection or no connection to the other party by judging whether or not the destination user terminal 100b responds to the transmitted phone call.

In the step S11, if judging that the destination user terminal 100b responds to the transmitted phone call, in other words, if detecting a connection to the other party (YES), the phone call transmitting module 160 ends this process to allow the source user terminal 100a to start a phone call with the destination user terminal 100b.

On the other hand, if judging that the destination user terminal 100b does not respond to the transmitted phone call (NO), the phone call transmitting module 160 of the source user terminal 100a judges whether or not the source user terminal 100a is being connected with the voice mail system 200 for the destination user terminal 100b (step S12). In the step S12, if judging that the source user terminal 100a is not being connected with the voice mail system 200 for the destination user terminal 100b (NO), the phone call transmitting module 160 repeats the process of the step S11. In the step S12, the phone call transmitting module 160 may judge whether or not the source user terminal 100a is not being connected with the voice mail system 200 based on whether or not the destination user terminal 100b responds to the transmitted phone call within a predetermined time, whether or not the source user terminal 100a detects a connection with the voice mail system 200, or whether or not the source user terminal 100a receives and recognizes a voice message output from the voice mail system 200. Furthermore, the phone call transmitting module 160 may judge this by other methods.

On the other hand, if the phone call transmitting module 160 of the user terminal 100 judges that the user terminal 100 is being connected with the voice mail system 200, in other words, if the phone call transmitting module 160 detects no connection to the other party (YES), the voice message receiving module 161 of the user terminal 100 receives a predetermined voice message output from the voice mail system 200 (step S13). In the step S13, an example of the predetermined voice message received by the voice message receiving module 161 includes "This is the voice mail system service."

The phone call transmitting module 160 of the source user terminal 100a stops transmitting the phone call to the destination user terminal 100b before the source user terminal 100a is connected with the voice mail system 200 (step S14). In the step S14, the phone call transmitting module 160 stops transmitting the phone call by disconnecting a line to the destination user terminal 100b. In the step S14, "before the source user terminal 100a is connected with the voice mail system 200" means "before the user of the source user terminal 100a stores a voice message in the voice mail system 200."

Figure 5:
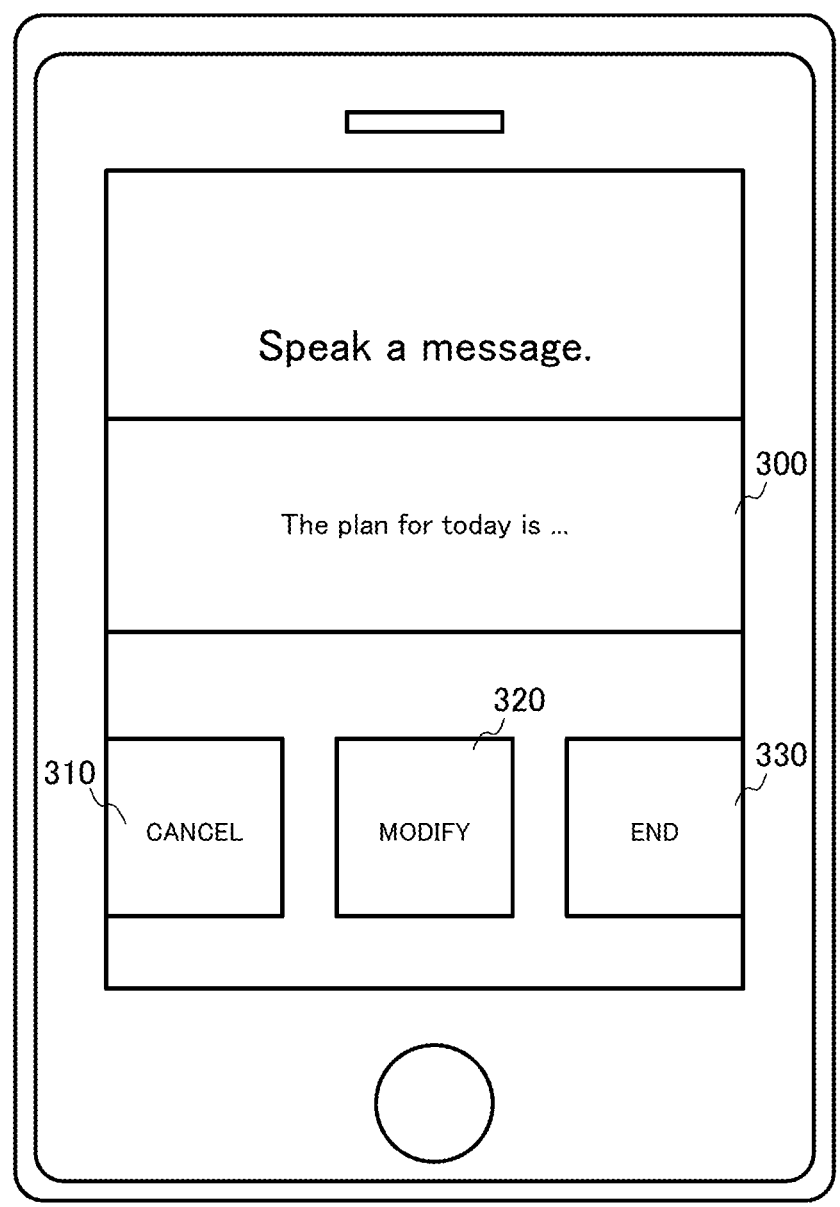

The application module 170 of the source user terminal 100a starts a voice recognition application. The input receiving module 180 of the user terminal 100a displays the voice recognition screen shown in FIG. 5, receives an input of a voice message, and converts the received input of a voice message into a text message (step S15). FIG. 5 shows a voice recognition screen displayed by the input receiving module 180. In FIG. 5, the input receiving module 180 displays the result of the received and recognized input of a voice message, a message display field 300 to display a text message converted from the recognized input of a voice message, a message input cancel field 310 to cancel an input of a voice message, a message modification field 320 to modify an input of a voice message, and a message input end field 330 to end an input of a voice message.

If receiving an input operation to the message input cancel field 310, the input receiving module 180 of the source user terminal 100a stops receiving an input of a voice message and ends this process. If receiving an input operation to the message modification field 320, the input receiving module 180 modifies a voice message. For example, modifying a voice message is to receive a re-input of a voice message from the part where a user taps in the message display field 300, to receive a re-input of a voice message after or before the part where a user taps in the message display field 300, and to remove all the received input of a voice message and receive an input of a voice message again. If receiving an input operation to the message input end field 330, the input receiving module 180 stops receiving an input of a voice message. Input operation to the message input cancel field 310, the message modification field 320, and the message input end field 330 may be performed by voice.

In the step S15, a voice recognition application may always run. In this case, the input receiving module 180 of the source user terminal 100a only has to display a voice input receiving screen at the same time when transmitting the phone call is ended in the step S14. Alternatively, the input receiving module 180 may receive a voice input without displaying a voice input receiving screen.

The input receiving module 180 of the source user terminal 100a judges whether or not a voice input from a user has ended (step S16). In the step S16, if judging that a voice input from a user has not ended, in other words, if judging that an input operation to the message input end field 330 has not been performed (NO), the input receiving module 180 repeats this process.

On the other hand, in the step S16, if the input receiving module 180 judges that a voice input from a user has ended, in other words, if judging that an input operation to the message input end field 330 has been performed (YES), the application module 170 of the source user terminal 100a starts an address book application to extract a message address corresponding to the phone number of the destination user terminal 100b to which the source user terminal 100a transmits a phone call in the step S10 (step S17). In the step S17, the application module 170 refers to an address book application and searches the phone number that transmitted the phone call. The application module 170 acquires a message address associated with this phone number in an address book application.

The application module 170 of the source user terminal 100a starts a message application to generate a message (step S18). In the step S18, the application module 170 sets the message address extracted in the step S17 as the destination of a message and the text message generated in the step S15 as the body of a message.

The message transmitting module 162 of the source user terminal 100a transmits the message generated in the step S18 to the destination user terminal 100b (step S19).

In the step S17, if not extracting a message address corresponding to the phone number of the destination user terminal 100b, the application module 170 of the source user terminal 100a may specify another type of address for a message instead of a message address. For example, a phone number for a short message service (hereinafter referred to as "SMS"), an ID for the Internet phone service, etc., may be set instead of a message address. In this case, the application module 170 only has to transmit a message to a phone number or an identifier set instead of a message address in the step S19.

Figure 6:
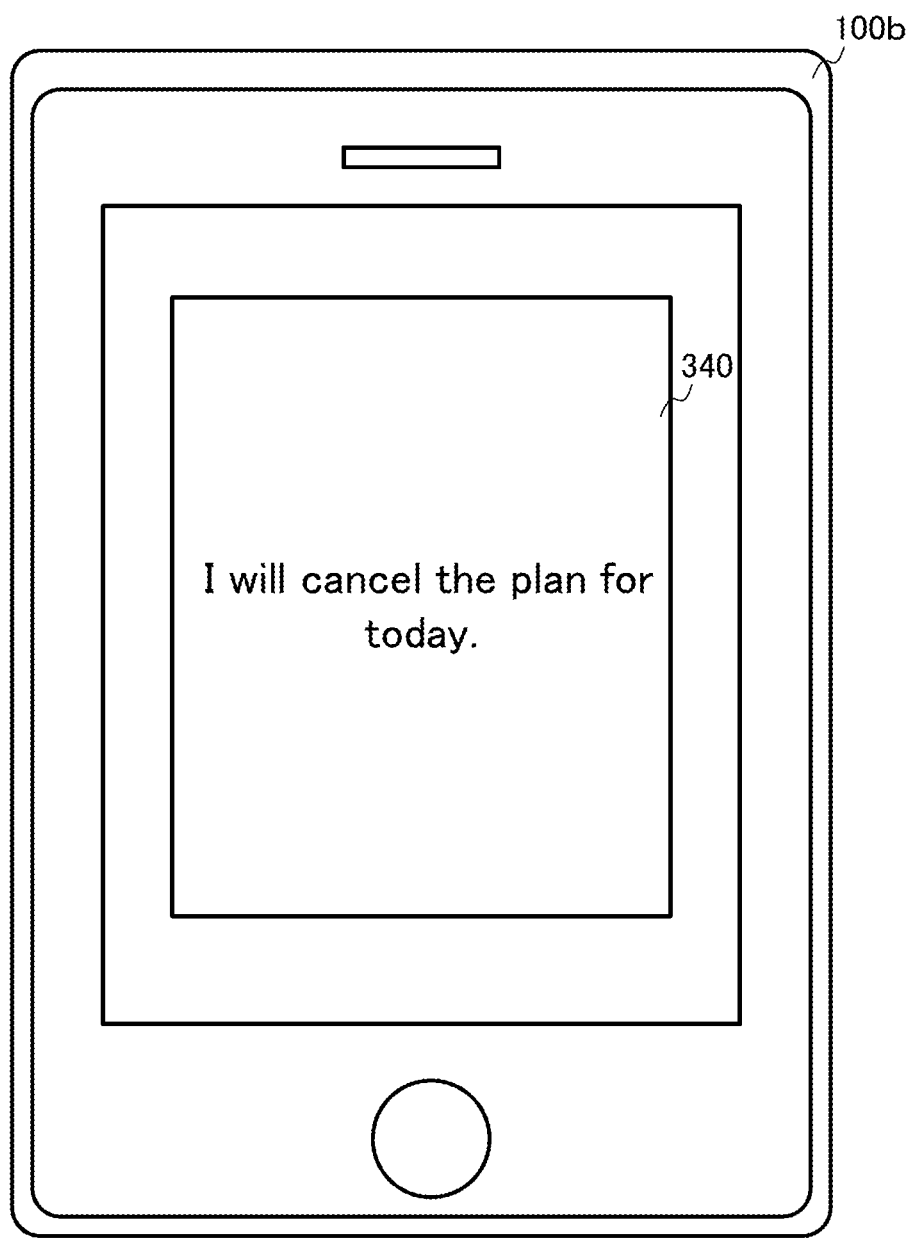
FIG. 6 shows a message display screen displayed on the destination user terminal 100b.

The message receiving module 163 of the destination user terminal 100b receives the message transmitted from the source user terminal 100a. The input receiving module 180 of the destination user terminal 100b receives an input of a message display operation from a user and displays the message display screen shown in FIG. 6. FIG. 6 shows a message display screen displayed by the message transmitting module 163 of the destination user terminal 100b. In FIG. 6, the message transmitting module 163 displays the received message in the received message display frame 340.

To achieve the means and the functions that are described above, a computer (including CPU, an information processor, and various terminals) reads and executes a predetermined program. For example, a program is provided in forms recorded in a computer-readable record medium such as a flexible disk, a CD (e.g., CD-ROM), or a DVD (e.g., DVD-ROM, DVD-RAM). In this case, a computer reads a program from the record medium, forwards and stores the program to and in an internal or an external storage, and executes it. For example, the program may be preliminarily recorded in a storage (record medium) such as a magnetic disk, an optical disk, or a magnetic optical disk, and then provided from the storage to a computer through a communication line.

The embodiments of the present invention are described above. However, the present invention is not limited to the above-mentioned embodiments. The effect described in the embodiments of the present invention is only the most preferable effect produced from the present invention. The effects of the present invention are not limited to those described in the embodiments of the present invention.

REFERENCE SIGNS LIST

1 Message transmitting system
3 Public line network
100 User terminal
200 Voice mail system

What is claimed is:

1. A user terminal of a caller, comprising:
   a voice transmitting unit that transmits a phone call to a phone number of an other party to connect to the phone number of the other party;
   a detection unit that detects no connection to a called terminal of the other party by the transmitted phone call;
   a disconnection unit that disconnects a line between the user terminal and the called terminal before the caller stores a voice message to a voice mail system for the other party if the detection unit detects no connection to the called terminal of the other party;
   a voice message input receiving unit that receives an input of the voice message from the caller;
   a text conversion unit that converts the received voice message into a text message;
   a message address extraction unit that extracts a message address of the other party corresponding to the phone number of the other party; and
   a message transmitting unit that transmits the converted text message to the extracted message address.

2. The user terminal according to claim 1, wherein the detection unit detects no connection to the called terminal of the other party by a connection with the voice mail system.

3. The user terminal according to claim 1, wherein the detection unit detects no connection to the called terminal of the other party by recognizing voice from the voice mail system.

4. A method of transmitting a message by a user terminal of a caller, comprising:
   transmitting a phone call to a phone number of an other party to connect to the phone number of the other party;
   detecting no connection to a called terminal of the other party by the transmitted phone call;
   disconnecting a line between the user terminal and the called terminal before the caller stores a voice message to a voice mail system for the other party if detecting no connection to the called terminal of the other party;
   receiving an input of a voice message from the caller;
   converting the received voice message into a text message;
   extracting a message address of the other party corresponding to the phone number of the other party; and transmitting the converted text message to the extracted message address.

5. A computer program product for use in a user terminal of a caller, comprising a non-transitory computer usable medium having a set of instructions physically embodied therein, the set of instructions including computer readable program code, which when executed by the user terminal causes the information processing unit to:
   transmit a phone call to a phone number of an other party to connect to the phone number of the other party;
   detect no connection to a called terminal of the other party by the transmitted phone call;
   disconnect a line between the user terminal and the called terminal before the caller stores a voice message to a voice mail system for the other party if detecting no connection to the called terminal of the other party;
   receive an input of a voice message from the caller;
   convert the received voice message into a text message;
   extract a message address of the other party corresponding to the phone number of the other party; and
   transmit the converted text message to the extracted message address.

\* \* \* \* \*